(12) United States Patent
Weiβ et al.

(10) Patent No.: US 9,446,802 B2
(45) Date of Patent: Sep. 20, 2016

(54) TRACK PAD

(75) Inventors: Oliver Weiβ, Colmar (FR); Frederic Neyer, Colmar (FR); Vincent Dreyer, Colmar (FR)

(73) Assignee: Liebherr•Mining Equipment Colmar SAS, Colmar (FR)

( * ) Notice: Subject to any disclaimer, the term of this patent is extended or adjusted under 35 U.S.C. 154(b) by 459 days.

(21) Appl. No.: 13/823,944

(22) PCT Filed: Sep. 11, 2012

(86) PCT No.: PCT/EP2012/003811
§ 371 (c)(1),
(2), (4) Date: Jul. 10, 2013

(87) PCT Pub. No.: WO2013/037480
PCT Pub. Date: Mar. 21, 2013

(65) Prior Publication Data
US 2013/0277126 A1    Oct. 24, 2013

(30) Foreign Application Priority Data
Sep. 13, 2011    (EP) ..................................... 11007448

(51) Int. Cl.
*B62D 55/26*  (2006.01)
*B62D 55/06*  (2006.01)
*B62D 55/28*  (2006.01)

(52) U.S. Cl.
CPC ............... *B62D 55/06* (2013.01); *B62D 55/26* (2013.01); *B62D 55/28* (2013.01)

(58) Field of Classification Search
CPC .... B62D 55/20; B62D 55/26; B62D 55/275; B62D 55/28; B62D 55/283; B62D 55/286
USPC ......... 305/187, 190–191, 196, 198, 200–201
See application file for complete search history.

(56) References Cited

U.S. PATENT DOCUMENTS

| | | | | |
|---|---|---|---|---|
| 1,786,924 A | * | 12/1930 | Turnbull | ................ B62D 55/28 |
| | | | | 305/187 |
| D157,905 S | * | 3/1950 | Risk | .............................. 305/191 |
| 3,847,451 A | * | 11/1974 | Freedy | ................... B62D 55/28 |
| | | | | 305/191 |
| 5,482,365 A | * | 1/1996 | Peterson | .............. B62D 55/275 |
| | | | | 305/197 |
| 5,913,579 A | | 6/1999 | Kumano et al. | |
| 2003/0062772 A1 | | 4/2003 | Rasmussen | |

FOREIGN PATENT DOCUMENTS

| | | |
|---|---|---|
| CA | 468759 A | 10/1950 |
| JP | 2002234470 A | 8/2002 |
| JP | 2009-154684 A | 7/2009 |

(Continued)

*Primary Examiner* — Jason Bellinger
(74) *Attorney, Agent, or Firm* — Dilworth & Barrese, LLP

(57) ABSTRACT

The present invention relates to a track pad for a chain of a chain wheel drive, the track pad having a bearing surface provided with at least one grouser (1, 2), extending in the lateral direction of the bearing surface, wherein at least one flat part (4, 5) is provided next to at least one grouser part (1, 2) in the lateral direction of the bearing surface. Further, the invention comprises a track pad for a chain of a chain wheel drive, the track pad having a bearing surface provided with at least one grouser (32, 33) protruding from a base plate (40), the grouser (32, 33) extending in the lateral direction of the bearing surface, wherein the bearing surface of the base plate has a profile in the lateral direction.

18 Claims, 5 Drawing Sheets

(56) References Cited

FOREIGN PATENT DOCUMENTS

| RU | 1794787 A1 | 2/1993 |
| RU | 21655 U1 | 1/2002 |
| SU | 89541 A1 | 10/1950 |
| WO | 20080155423 A1 | 12/2008 |

* cited by examiner

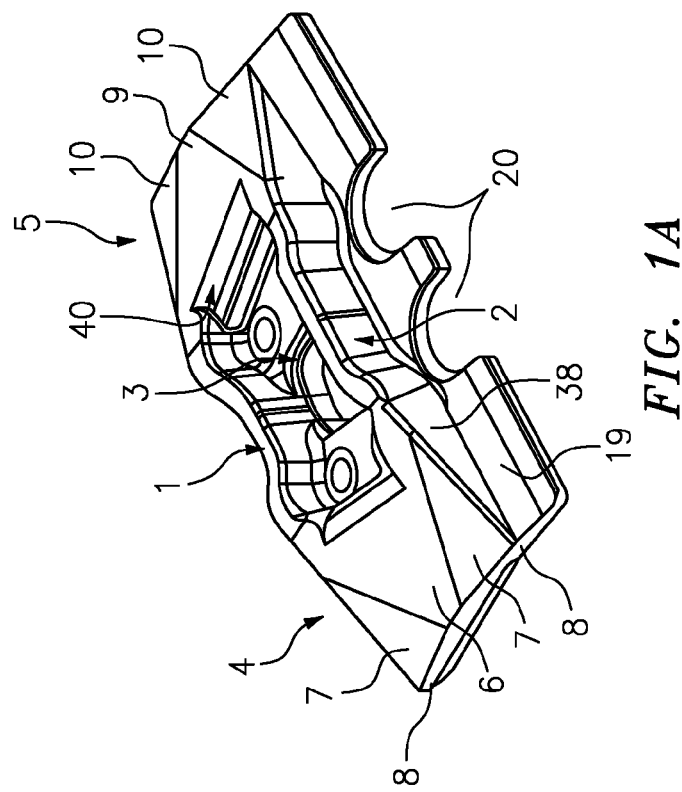
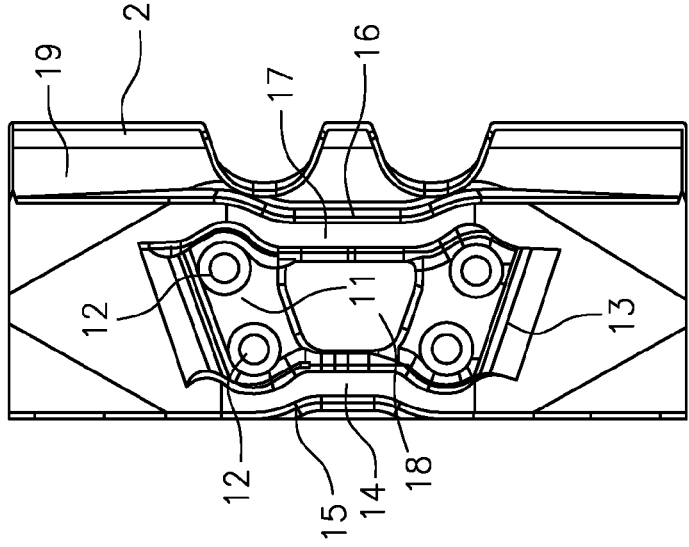
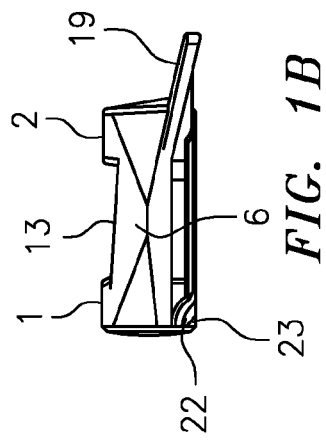
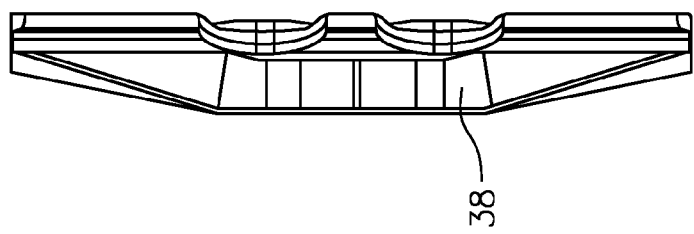

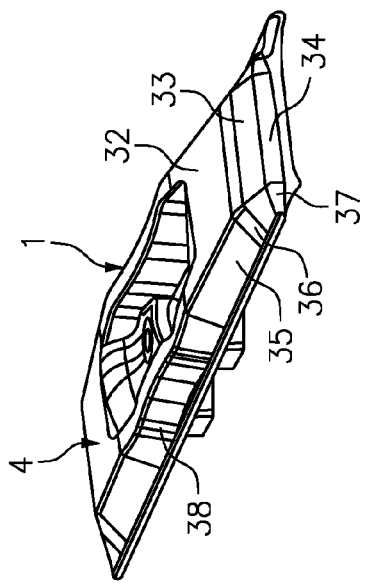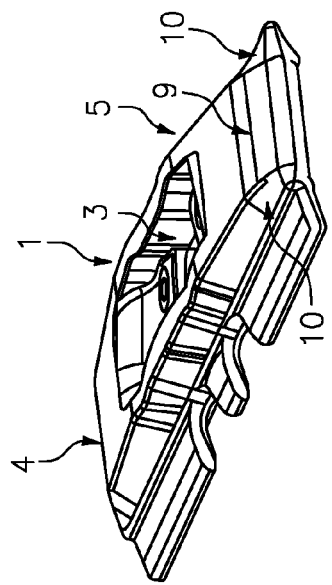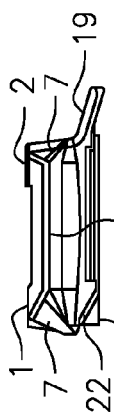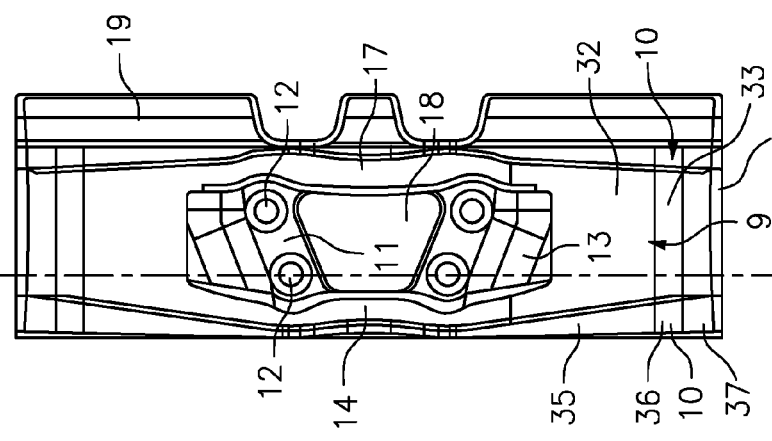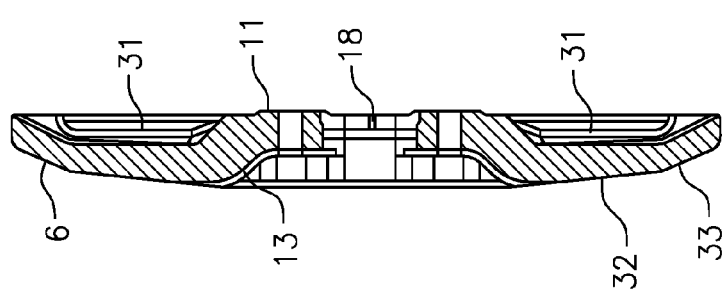

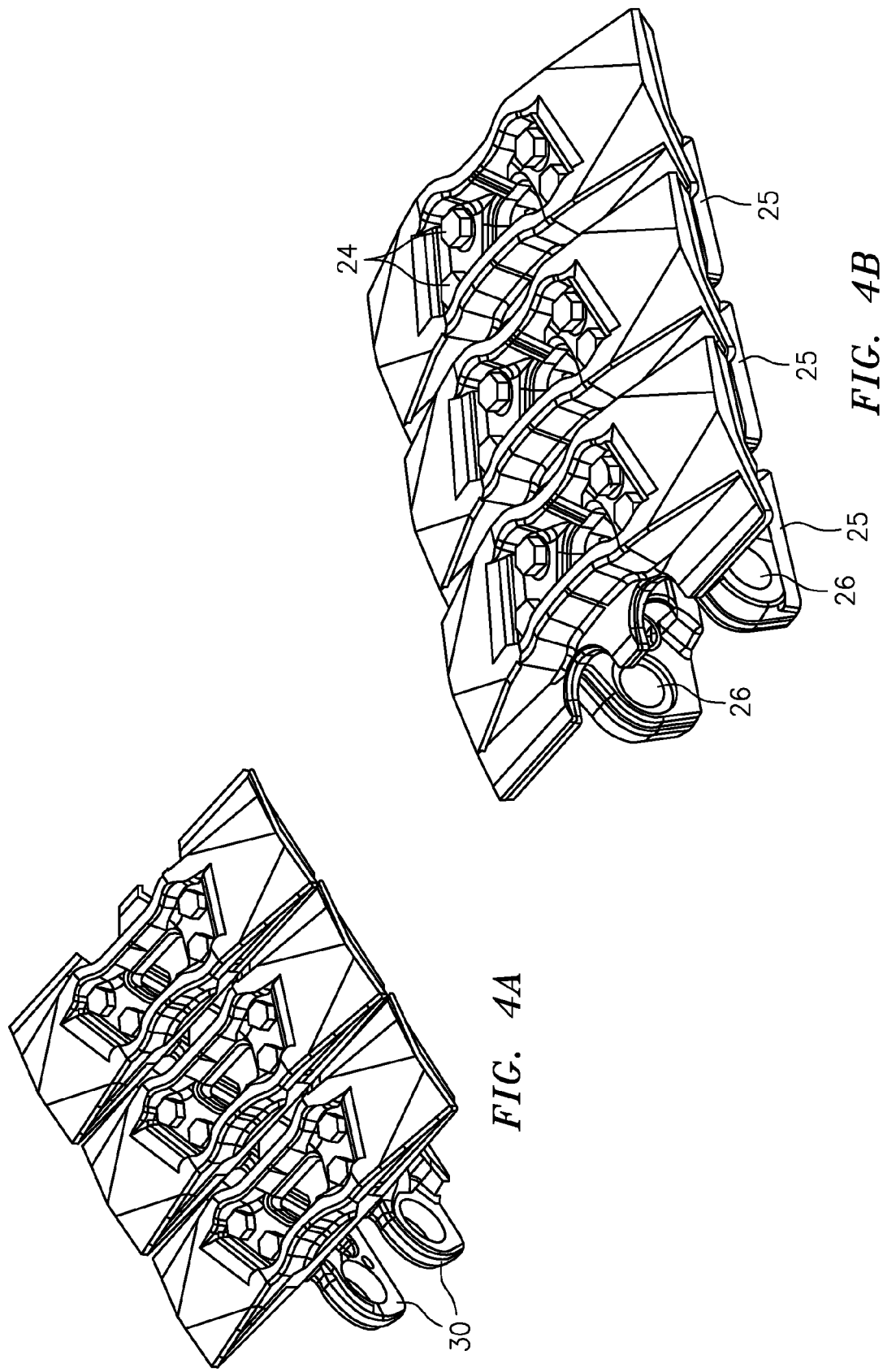

TRACK PAD

BACKGROUND OF THE INVENTION

The present invention relates to a track pad for a chain of a chain wheel drive, the track pad having a bearing surface provided with at least one grouser extending in the lateral direction of the bearing surface. In particular, the grouser may extend form a base plate of the track pad.

Known track pads have a grouser pad profile of the bearing surface in order to provide a maximum of grip of the bearing surface with the ground for translational movement in the forward or backward direction or a flat pad profile to provide a maximum contact surface of the bearing surface.

In known track pads having a grouser pad profile, the track pad is constituted by a flat base plate from which the grousers extend along the entire lateral width and have, at least over most part of the track pad, the same elevation. Such a track pad may be mounted to a chain of a chain wheel drive by screws that go through holes provided in the base plate.

However, when the machine moves around a corner, the two chain wheel drives perform a rotating movement such that the grip provided by the grousers creates large shearing forces within the chain. In particular, when the track pads are fixed to the chain elements of the chain by fixing screws, there will be large shearing forces acting on these screws and the portion of the track pad where the screws are located. This will lead to considerable wear-down of the track pads grousers and might lead to the shearing of the fixing screws. Further, the grousers of known grouser pads also create a lot of destruction on the soil during rotation of the chain wheel drive around a vertical axis.

SUMMARY OF THE INVENTION

In view of these problems, the present invention is directed to providing track pads having improved properties.

This object is solved by a track pad according to the description herein in a first aspect and in a second aspect of the present invention. Preferred embodiments of the present invention are the subject matter of the description herein.

In a first aspect, the present invention provides a track pad for a chain of a chain wheel drive, the track pad having a bearing surface provided with at least one grouser extending in the lateral direction of the bearing surface. Further, at least one flat part is provided next to at least one grouser part in the lateral direction of the bearing surface. By combining the at least one flat part having a flat profile and the grouser part having a grouser pad profile, the present invention combines the advantages of a grouser pad profile and a flat pad profile on the same track pad. The present invention thereby facilitates the rotation of the chain wheel drive and the undercarriage of the machine on the ground while simultaneously keeping the good adherence properties during forward and backward travel phases.

Preferably, the flat parts of the bearing surface constitute between 10% and 90% of the entire bearing surface, more preferably between 20% and 60% of the bearing surface, even more preferably between 30% and 50% of the bearing surface.

Further, the flat parts of the bearing surface preferably extend along 10% to 90% of the lateral extension of the bearing surface, when averaged over the longitudinal extension of the bearing surface, more preferably between 20% and 60% of the lateral extension of the bearing surface and most preferably between 30% and 50%.

In a preferred embodiment, lateral flat parts are provided on both sides of the pad. This will provide particular good properties of the track pad upon rotation of the undercarriage.

Further, the grouser part of the present invention preferably has at least two grousers extending in the lateral direction. In the most preferred embodiment, exactly two grousers are provided. In particular, the grousers may extend along the longitudinal edges of the bearing surface.

In a further preferred embodiment, the lateral parts taper away from an elevated inner portion to a lower outer portion in the lateral direction. This taper provides particular good properties upon turning. Preferably, the taper portion extends from the central portion to the lateral edges of the track pad.

In a further preferred embodiment, the lateral parts taper away from an elevated inner portion to lower outer portions on both sides in the longitudinal direction. This also provides particular good turning properties.

Preferably, the taper is directed with an angle with respect to the longitudinal direction. In a particular preferred embodiment the taper in the longitudinal direction becomes larger from an inner portion to an outer portion in the lateral direction. In a particular preferred embodiment the taper is directed in the direction of the corners of the bearing surface.

The taper in the longitudinal direction may be provided without a taper in the lateral direction and vice versa. However, in a particularly preferred embodiment, a taper in the lateral direction is combined with a taper in the longitudinal direction.

In particular, one or more portions tapering at least in the lateral direction may be combined with one or more portions tapering at least in the longitudinal direction. In particular, a middle section may taper in the lateral direction. Further, corner portions may taper in a direction that is at an angle both with the lateral and the longitudinal direction.

In a second aspect the present invention provides a track pad for a chain of a chain wheel drive, the track pad having a bearing surface provided with at least one grouser protruding from a base plate, the grouser extending in the lateral direction of the bearing surface. According to the second aspect, the bearing surface of base plate has a profile in the lateral direction.

This means that the bearing surface of the base is no longer flat, as in the prior art, but has an elevation that varies in the lateral direction. Thereby a profile of the bearing surface of the track pad is provided that does not only vary (with respect to the longitudinal direction) by providing the grousers, but also in the lateral direction because of the profiled base plate extending next to the grouser.

Preferably, the variation in the elevation of the bearing surface of the base plate is more than 20% of the maximum thickness of the base plate, more preferably more than 40%, and most preferably more than 80%.

Preferably, the profiled part of the base plate may constitute more than 10% of the lateral extension of the bearing surface of the base plate, more preferably more than 20% and most preferably more than 40%.

In a preferred embodiment, the track pad has at least two grousers extending in the lateral direction, which protrude from the base plate. Preferably, the section of the base plate having the profile in the lateral direction is located between the two grousers.

The profile of the base plate from which the grouser protrudes may be used to enhance the properties of the track pad, for example in order to facilitate the rotation of the chain wheel drive and the undercarriage of the machine on the ground while simultaneously keeping the good adherence properties during forward and backward travel phases, or in order to decrease the wear of fixing elements for fixing the track pad to the chain.

In a preferred embodiment, the base plate may taper away to a lower outer portion in the lateral direction at least in one lateral part of the track pad. This taper of the base plate will improve the turning properties of the chain wheel drive.

Further, the tapering surface of the base plate may have an at least partially convex shape. Such a convex shape of the base plate will lead to less friction of the track pad upon turning.

Preferably, the tapering surface of the base plate and/or the convex shape is provided in both lateral parts of the track pad. This taper of the base plate will improve the turning properties of the chain wheel drive.

In a further preferred embodiment, the bottom surface of the base plate may also have a profile. Preferably, the profile on the bottom surface substantially follows the profile on the bearing surface. Thereby, the thickness of the base plate will not have strong variations in the lateral direction. This will decrease stress created in the track pad upon production.

Preferably, the thickness of the base plate will not vary for more than 50% with respect to the thickest part over at least over 80% of the extension of the base plate in the lateral direction, and preferably over at least 95% of the extension of the base plate in the lateral direction. In particular, the thickness might slowly decrease from a central portion to the lateral portions.

In a preferred embodiment of the second aspect, also the at least one grouser has a profile in the lateral direction.

Preferably, the grouser may taper away to a lower outer portion in the lateral direction at least in one lateral part of the track pad, and preferably in both lateral parts. This taper of the grouser will also improve the turning properties of the chain wheel drive.

Preferably, the tapering portions of the grouser will extend along 10% and 90% of the lateral extension of the bearing surface, more preferably between 15% and 70% of the lateral extension of the bearing surface, and most preferably between 30% and 50%.

The first and the second aspect of the present invention can be realised independently from each other. However, in a particularly preferred embodiment of the present invention, both aspects are combined.

For example, the profile of the grouser may run substantially along the profile of the base plate in the lateral parts of the track pad, in order to form, together with the base plate, a flat portion in the lateral parts.

In the context of the present invention, the flat part does not necessarily have to have a surface structure that is entirely without profile.

For example, as described above, the flat part may have portions of different taper and therefore a certain profile. In particular, the flat part may have a convex profile in the longitudinal direction. Further, the grousers may also be present in the flat part, but have a lower profile than in the grouser part.

For the present invention the main point is that the flat part of the bearing surface has a profile that is flatter than the profile of the grouser part. In particular, the profile should be flatter in the longitudinal direction than in the grouser part. In particular, the flat part should have a profile that is decidedly flatter than the grouser part.

Preferably, the elevation of the grousers over the base plate in the grouser part is more than 2 times higher than the elevation of the grousers over the base plate in the flat part, more preferably more than 3 times, most preferably more than 5 times.

Further, in the present invention, the grouser part may have, in the longitudinal direction, sections which have a slope that is at least two times as large as the maximum slope in the flat parts, preferably four times as large, and more preferably ten times as large.

Further, in a preferred embodiment, the grousers may have an elevation over the bottom of a recess formed between them that is at least 50% of the entire tapering elevation of the lateral parts in the lateral or in the longitudinal direction and preferably is at least 80% of this elevation and may even be larger than this elevation.

In the following, preferred features of the present invention are described that can be combined both with the first aspect, as well as with the second aspect, or with both aspects.

In such a preferred embodiment, the bearing surface may taper away to a lower edge portion at least on one longitudinal side of the track pad at least in the longitudinal direction, at least in one lateral part of the track pad.

More preferably, the taper is provided on both longitudinal sides and/or in both lateral parts of the track pad.

The taper on the longitudinal side may be directed, as described above, both in the lateral and the longitudinal side.

Further, the taper on the longitudinal side may form a side portion of the flat portion, and in a particular embodiment a side portion of the grouser extending into the flat portion.

Further, in the present invention, a recess with respect to the surface of the lateral parts may be provided in the central portion. In particular, the side walls of this recess in the longitudinal direction may form the grousers.

With respect to the first aspect of the present invention, the grouser pad profile in the central portion may be provided by having a recess within the otherwise substantially flat surface of the bearing surface.

Further, the grousers of the central portion may have substantially the same elevation as the lateral parts at the position where they join the grousers.

With respect to the second aspect of the present invention, the recess may be provided in the base plate from which the at least one grouser protrudes.

With respect to both aspects, the recess, and in particular a recess provided between the grousers, may have side walls tapering up to the lateral parts. Further, the recess may extend slightly into the lateral parts. Further, the tapering sides of the recess may have a concave shape followed by a convex shape.

In particular, with respect to the second aspect, the bearing surface of the base plate may taper from a central portion to an elevated portion on both lateral sides of the central portion. Preferably, as described before, the bearing surface of the base plate will taper down from these elevated portions to the lateral sides.

Further, if the bottom side of the base plate has a profile in the lateral direction, as well, the bottom side preferably may have recesses under the lateral parts of the of the track pad. In particular, the bottom surface may rise up from a central portion to an elevated portion on both lateral sides of the central portion. Preferably, the bottom surface of the base plate will then taper down from these elevated portions to the lateral sides.

With respect to both aspects, the elevation of the grousers may be higher than the elevation of the flat parts where they join the recess provided between the grousers.

The track pad according to the present invention may further have means for being fastened to a chain element of the chain. Preferably, holes are provided for this purpose in the track pad, through which it can be fixed by fixing screws to the chain element. Preferably, the means for being fastened and in particular the holes are arranged in the central portion and/or between two grousers.

Particularly, the means for being fastened and in particular the holes may be arranged in the recess, wherein the recess preferably has a bottom surface in which the holes are arranged. Thereby, the fixing screws are protected by the walls of the recess.

Preferably, the recess has a bottom surface in which the holes are arranged.

Further, the recess may have a bottom surface provided with a further through hole arranged in the middle between the holes for the fixing screws.

Further, the recess may have lateral side walls that extend in an angle to the longitudinal direction. Thereby, the recess will have the form of a trapezoid.

Further, two or more means for being fastened and in particular two or more holes may be provided on each side of the central part for fixing it to the chain elements. Preferably, the holes are arranged in an angle with respect to the longitudinal direction. Preferably, the lateral side walls follow this angle defined by the fastening means.

Further, the grousers may have at least one portion in the form of an arc extending in the lateral direction. Further, the distance between the grousers may become smaller towards a middle portion of the central portion.

The track pad of the present invention may further have a side step portion provided along one of the longitudinal sides of the bearing surface. This side step portion may extend below the next track pad along the chain.

Further, the track pad may have a tapered portion provided along one of its longitudinal sides on its underside. This tapered portion may receive a side step portion of the next track pad along the chain.

Further, a side step portion may have at least one indentation for receiving a protrusion on the underside of the next track pad. Thereby, shearing forces on a single track pad will be divided between joining track pads. Preferably, at least two such indentations for receiving at least two protrusions are provided.

In a particular preferred embodiment of the first aspect of the present invention the at least one flat part and the at least one grouser part are integrally formed. In particular they may be integrally formed by moulding or forging.

In a particular preferred embodiment of the second aspect of the present invention the base plate and the at least one grouser part are integrally formed. In particular they may be integrally formed by moulding or forging.

In a particular preferred embodiment of both aspects, the bearing surface of the track pad is integrally formed, and in particular the entire track pad is integrally formed. In a preferred embodiment the entire track pad is formed by moulding or forging.

In particular, the entire track pad may be formed from metal, in particular from steel.

Further, in the present invention, the extension of the bearing surface of the track pad in the lateral direction may be larger than the extension in the longitudinal direction. In particular, the extension of the bearing surface of the track pad in the lateral direction may be at least two times as large as the extension in the longitudinal direction and preferably more than three times as large.

The present invention further comprises a chain for a chain wheel drive having track pads as described above. Preferably, the track pads are mounted on the chain elements of the chain.

Further, the present invention also comprises a chain for chain wheel drive having track pads as described above. Such a chain wheel drive may be mounted on the undercarriage of a machine, and preferably on the two lateral sides of the undercarriage.

Further, the present invention comprises a moveable machine having at least two chain wheel drives equipped with chains which are equipped with track pads according to the present invention.

In particular, the moveable machine of the present invention may be an earth moving machine. Further, the moveable machine may also be a crawler crane.

Further, the moveable machine of the present invention may have a moveable working equipment and in particular a hydraulically activated working equipment, for example a working equipment provided on a boom or a working element that is fixed to the moveable machine and moveable around a horizontal axis.

BRIEF DESCRIPTION OF THE DRAWINGS

The present invention will now be described on the basis of figures and an embodiment. Thereby, the figures show:

Figs. 1A-1D: a first embodiment of a track pad of the present invention in a perspective view, a top elevation view, a lateral side elevation view and a longitudinal side elevation view, FIGS. 2A-2F: a second embodiment of a track pad of the present invention in two perspective views, a top elevation view, a lateral side elevation view, a longitudinal side elevation view and a sectional view.

DESCRIPTION OF THE PREFERRED EMBODIMENTS

Figure 3A:
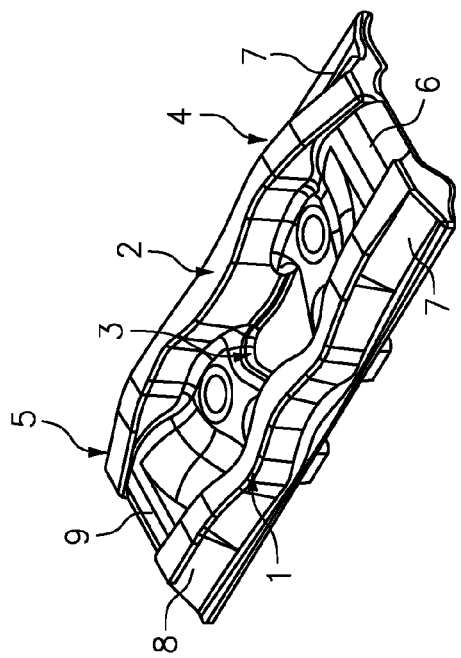
FIGS. 3A-3F: a third embodiment of a track pad of the present invention in two perspective views, a top elevation view, a lateral side elevation view, a longitudinal side elevation view and a sectional view, FIGS. 4A. 4B: three chain elements of a chain provided with track pads according to the first embodiment.
Figure 3B:
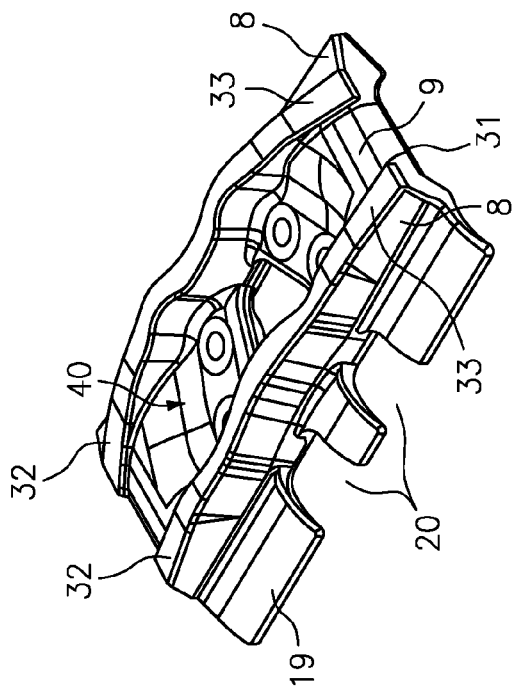
Figure 3C:
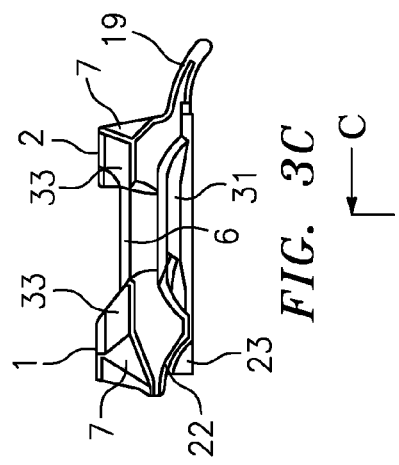
Figure 3F:
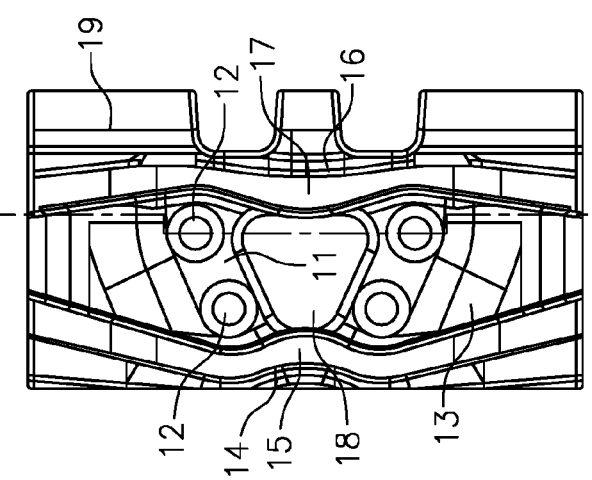
Figure 3E:
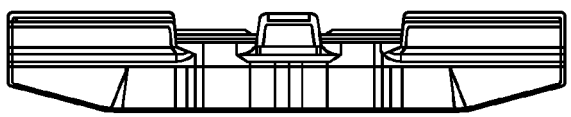
Figure 3D:
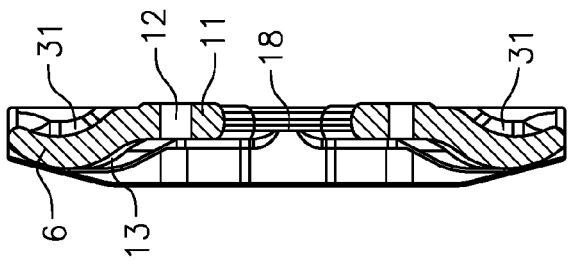

FIGS. 1 to 3 show a first, a second and a third embodiment of a track pad according to the present invention incorporating both the first and the second aspect of the present invention.

According to the first aspect, the track pad has a bearing surface provided with grousers 1 and 2 in a central grouser part and flat lateral parts 4 and 5 on both sides of the central grouser part in the lateral direction. According to the second aspect of the present invention, the bearing surface of the base plate 40 from which the grousers 1 and 2 project has a profile in the lateral direction.

In the first and second embodiments shown in FIGS. 1 and 2, the bearing surface of the base plate 40 has the same profile as the grousers in the flat lateral parts 4 and 5, such that no distinction between the grousers and the base plate is discernable in this region.

In contrast, in the third embodiment shown in FIG. 3, the grousers have lateral grouser sections 32 and 33 extending in the flat lateral regions 4 and 5 and are therefore still discernable, but these lateral grouser sections 32 and 33 have an elevation over the lateral base plate sections 6 and 9 that is distinctively smaller than the elevation of the central grouser sections 14 and 17 over the central base plate section 11.

Thereby, on the same track pad, the advantages of a grouser pad profile and of a flat pad profile are combined according to the first aspect, and the bearing surface is provided with a profile not only in the longitudinal direction, but also in the lateral direction according to the second aspect. Both aspects facilitates the undercarriage rotation movements on the ground and keeps simultaneously the adherence properties during the forward and backward travel phases.

The grouser pad profile in the central part of the track pad is formed by two grousers 1 and 2 extending along the longitudinal side edges of the bearing surface, and a recess 3 arranged between the two grousers 1 and 2. Therefore, in the central part, the base plate is formed by the bottom 11 of the recess 3.

The flat lateral parts 4 and 5 both decrease progressively in elevation from the portion where there are joined to the central section comprising the highest elevation of the grousers 1 and 2 both in the lateral end in the longitudinal direction.

For this purpose, in the first and second embodiments shown in FIGS. 1 and 2, a middle flat section 6 or 9 of each lateral part tapers in the lateral direction from the elevation of the grousers 1 and 2 to the lateral edge of the bearing surface. Further, corner portions 7 and 10 taper away from this middle flat portion 6 in a direction that is at an angle both with the lateral end the longitudinal direction, the taper being directed substantially in the direction of the corners 8 of the bearing surface.

In the first embodiment, the corner portions and the middle flat portion are each formed by single flat section having constant taper. Further, at the lateral edges, the corner portions each have an extension in the longitudinal direction that is larger than the extension of the middle flat portion in the longitudinal direction.

In the second embodiment, the corner portions 7 and the middle flat portion 6 have a taper that gradually increases in the lateral direction. In particular, the middle flat portion 6 is formed by a first flat section 32 having a first taper, followed by a second flat section 33 having a second, larger taper. The first and second flat sections both have approximately constant taper and are joined by a rounded section. Further, the lateral edge 34 of the middle flat portion 6 is rounded.

The corner portions 7 in the second embodiment essentially follow this form of the middle flat section 6, with a first corner flat sections 35 followed by a second corner flat section 37 having a larger taper and a rounded edge corner section 37. The taper of the portions 7 increases both with respect to the lateral, as well as the longitudinal direction.

Further, in the second embodiment, at the lateral edges, the corner portions 7 each have an extension in the longitudinal direction that is smaller than the extension of the middle flat portion 6 in the longitudinal direction, with the corner portion on one longitudinal side having a larger extension than the corner portion on the other side.

In the first and second embodiment, the flat portions decrease progressively in all directions, starting from the grouser part to the extremity of the bearing surface.

For the same purpose, in the third embodiment shown in FIG. 3, the lateral base plate sections 6 and 9 of each lateral part tapers in the lateral direction from the point of the highest elevation of the base plate to the lateral edge of the bearing surface. The lateral grouser sections 32 and 33 also taper away from the elevation of the grousers 1 and 2 in the central part, having substantially the same taper as the lateral base plate sections 6 and 9 at least for a certain distance. Further, corner portions 7 and 8 taper away from the lateral grouser sections 32 and 33 in a direction that is at an angle both with the lateral and the longitudinal direction, the taper being directed substantially in the direction of the corners 8 of the bearing surface.

While the lateral grouser sections 32 and 33 have a substantially constant taper in the lateral direction, the lateral base plate sections 6 and 9 have a convex shape, with the taper increasing in the direction of the lateral sides to form a rounded lateral end.

In the first embodiment shown in FIG. 1, the longitudinal side portions 38 of the bearing surface are formed by steep surfaces that progressively loose in height from the end of the central grouser part to the lateral edges, and the corner portions 7 extend form the upper edge of these longitudinal side portions 38 as separate surfaces having a smaller taper.

In the second and third embodiments shown in FIGS. 2 and 3, the longitudinal side portions 38 of the bearing surface are formed by surfaces that are steep in the central grouser part, but progressively become less steep in the region of the lateral flat parts to form the corner portions 7.

In the present invention the track pad is symmetric with respect to its middle line. Therefore, both lateral parts are mirror-identical.

The track pad of the present invention is fixed to chain elements 25 by screws 24, as can be seen from FIG. 4. The chain elements 25 are joined with each other by pins going through the connectors 26 and 30.

For attaching the screws to the track pad, holes 12 are provided in the central grouser portion of the track pad. The holes 12 are provided in the recess 3 between the two grousers 1 and 2 and more specifically within a bottom surface 11 of the recess 3. The recess 3 is further provided with a through hole 18 forming the middle portion of the recess 3.

The holes 12 for the screws 24 are arranged on each side of the central portion along a line that is at an angle with the longitudinal direction. Further, the lateral side walls 13 of the recess 3 are also at an angle with the longitudinal direction, and follow the direction defined by the position of the holes 12.

Further, the side walls 13 of the recess taper up to the lateral flat parts 4 and 5, and in particular to the middle flat sections 6 and 9 in the first and second embodiments and the lateral base plate sections 6 and 9 of the second embodiment, while the longitudinal side walls of the recess forming side walls of the grousers 1 and 2 are steep.

In the second and the third embodiments shown in FIGS. 2 and 3, not only the bearing surface of the base plate has a profile, but also the bottom surface. As can be seen in the sectional view, the bottom surface is only flat in the central section 11 forming the bottom of the recess 3, and from there tapers upwards to an elevated part and then again slightly down to the lateral edges to form lateral bottom recesses 31 located under the lateral base plate sections 6 and 9. The profile of the bottom of the base plate therefore substantially follows the profile of the bearing surface of the base plate, leading to a thickness of the base plate that is free of large variations and that only slightly decreases in the lateral direction.

The bottom recesses 31 have a convex shape also in the longitudinal direction, with the bottom surface remaining substantially flat in the lateral direction under the grousers 1 and 2, and in particular under the longitudinal sides of the lateral sections 4 and 5, which in the third embodiment form the lateral grouser sections 32 and 33.

Further, in the third embodiment, the bottom surface of the lateral edges of the base plate has an elevation that is higher than that of the bottom surface of the central section 11, as can be seen in the side elevation view of FIG. 3.

In all embodiments, the grousers 1 and 2 both comprise an arcuate section 15 and 16 in their middle portion, such that the distance between the elevated portions 14 and 17 of the grousers 1 and 2 is smaller in the middle portion than at the sides of the central portion, in particular than at the position where the holes 12 for the screws are provided.

Further, as can be seen in the lateral and longitudinal side elevation views in FIGS. 1 to 3, the elevation of the bearing surface is highest in the middle of the grousers 1 and 2 and then tapers away to the lateral side in the flat parts 4 and 5, while the side walls 13 of the recess 3 have a lower elevation than the grousers 1 and 2.

The track pad is further provided with a side step portion 19 that extends along a longitudinal side of the bearing surface from one lateral end to the other lateral end of the track pad. The longitudinal edge of the bearing surface is joined to the side step portion in a step which is highest in the middle portion where the grouser 2 is provided and gets progressively smaller towards the lateral edges because of the tapered form of the flat lateral parts. The side step portion 19 is further provided with two indentations 20.

The side step portion 19 will extend below the next track pad along the chain when mounted to the chain elements 25, as can be seen from FIG. 4 and FIG. 5. Further, the other longitudinal edge of the track pad is provided with a tapered portion 22 along its underside. This tapered portion is for receiving the side step portion 19 of the next track pad along the chain. Further, protrusions 23 are provided that are received in the indentations20 in the side step portion of the next track pad.

Figure 5:
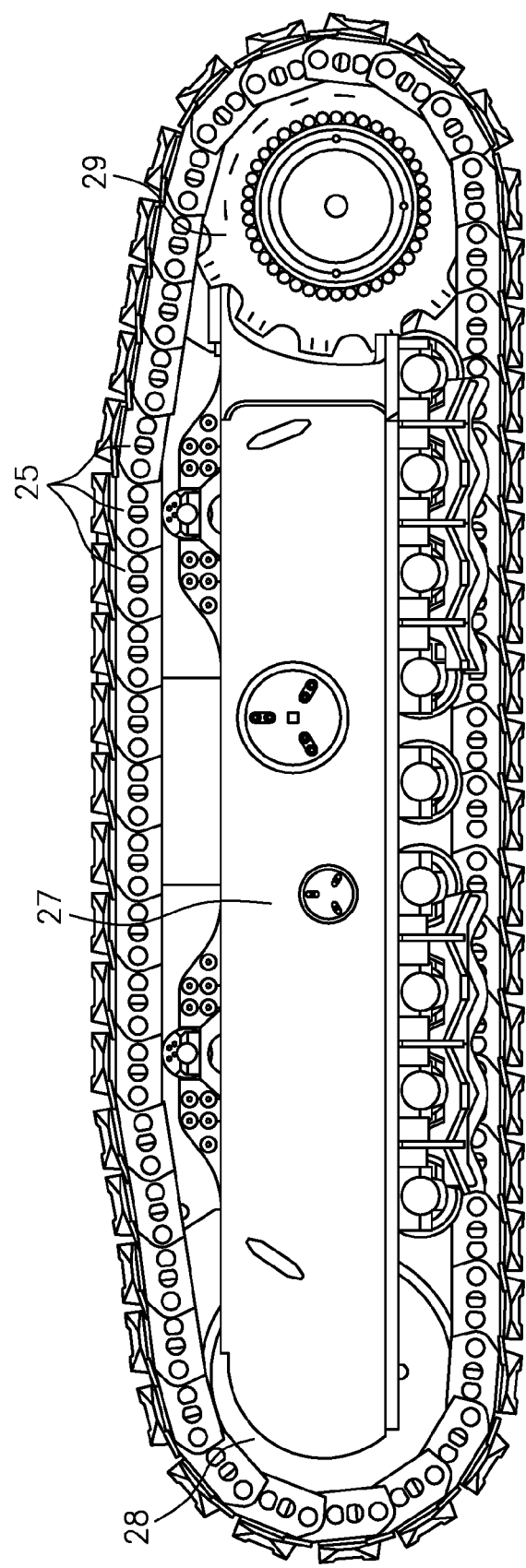
FIG. 5: a side elevation view of a chain wheel drive provided with a chain having track pads according to the first embodiment.

FIG. 5 shows a chain wheel drive provided with a chain having track pads of the present invention. The chain wheel drive is provided with a chassis 27 provided with chain wheels 29 and 28 on both ends over which the chain is guided. At least one of the chain wheels 28 or 29 is connected to an engine for moving the chain. For example, a hydraulic motor can be arranged in the chain wheel 29.

While FIGS. 4 and 5 show a chain wheel and a chain wheel drive equipped with track pads according to the first embodiment, the track pads of the second and third embodiments could be arranged on a chain wheel and a chain wheel drive in exactly the same manner.

A machine according to the present invention is provided with two such chain wheel drives, which are arranged at the undercarriage of the machine.

As a consequence of the present invention the track pad ground resistance during rotation of the undercarriage will be lowered on each track pad. Further, the surface in contact with the ground of each track is increased. This leads to reduce the ground pressure on each track pad and will lead to minimize the sinking phenomena and thus reduce the wear-out effect when in contact with the ground. Advantage will mainly be taken when a low penetration into the ground occurs.

Further, the present invention minimizes the ground reaction forces for the track pad upon rotation of the undercarriage and thus reduces the shearing forces generated on the fixing screws during the undercarriage rotation.

At the same time the present invention keeps the good adherence properties of a grouser pad profile during forward and backward travel phases.

The invention claimed is:

1. A track pad for a chain (25) of a chain wheel (28, 29) drive, the track pad having
   a bearing surface provided with two centrally-positioned grousers (1,2) extending in a lateral direction of the bearing surface,
   a recess (3) defined at a center between the two grousers (1, 2), and
   a pair of planar parts (4, 5) positioned directly next to lateral side walls (13) of the recess (3) on opposite sides thereof in the lateral direction of the bearing surface.

2. Track pad according to claim 1, wherein the planar parts taper away from an elevated inner portion to a lower outer portion in the lateral direction.

3. Track pad according to claim 1, wherein the planar parts taper away from an elevated inner portion to lower outer portions on both sides in the longitudinal direction.

4. Track pad according to claim 1, wherein the grousers protrude from a base plate (40), and a bearing surface of the base plate (40) has a profile in the lateral direction.

5. Track pad according to claim 4, wherein at least in one planar part of the track pad, the base plate tapers away to a lower outer portion in the lateral direction, and/or the tapering surface of the base plate has at least partially a convey shape, and/or a tapering surface of the base plate is provided in both planar parts of the track pad.

6. Track pad according to claim 4, wherein the grousers each have a profile in the lateral direction, and the profile of each said grouser follows the profile of the base plate (40) in the planar parts of the track pad, to form, together with the base plate (40), a planar portion in the planar parts.

7. Track pad according to claim 1, wherein at least in one planar part of the track pad, the bearing surface tapers away to a lower edge portion at least on one longitudinal side of the track pad in the longitudinal direction.

8. Track pad according to claim 1, wherein the side walls of the recess in the longitudinal direction form the grousers.

9. Track pad according to claim 8, wherein the recess side walls taper upwardly to the planar parts in the longitudinal direction.

10. Track pad according to claim 1, having holes for being fastened to a chain element of the chain, wherein the holes are arranged in the center and/or between the two grousers and/or in a bottom surface of the recess.

11. Track pad according to claim 8, wherein the recess has lateral side walls that extend at an angle to the longitudinal direction and/or two or more holes are provided on each side of the center and are arranged at an angle to the longitudinal direction.

12. A chain for a chain wheel drive having track pads according to claim 1, which are mounted on chain elements of the chain.

13. A movable having at least two chain wheel drives equipped with chains according to claim 12, and which is an earth moving machine or a crawler crane.

14. Track pad according, to claim 1, having only a single recess (3).

15. Track pad according to claim 2, wherein the planar parts taper away from the center to lateral edges of the track pad.

16. Track pad according to claim 7, wherein the bearing surface tapers on both longitudinal sides of the track pad.

17. Track pad according to claim 16, wherein the taper in the longitudinal direction is provided in both planar parts of the track pad.

18. Track pad according to claim 9, wherein the tapering surface of the side walls has a convex shape.

* * * * *